Nov. 7, 1950 — T. C. BROWN ET AL — 2,528,818
REAR DOOR END ASSEMBLY
Filed March 11, 1947 — 2 Sheets-Sheet 1
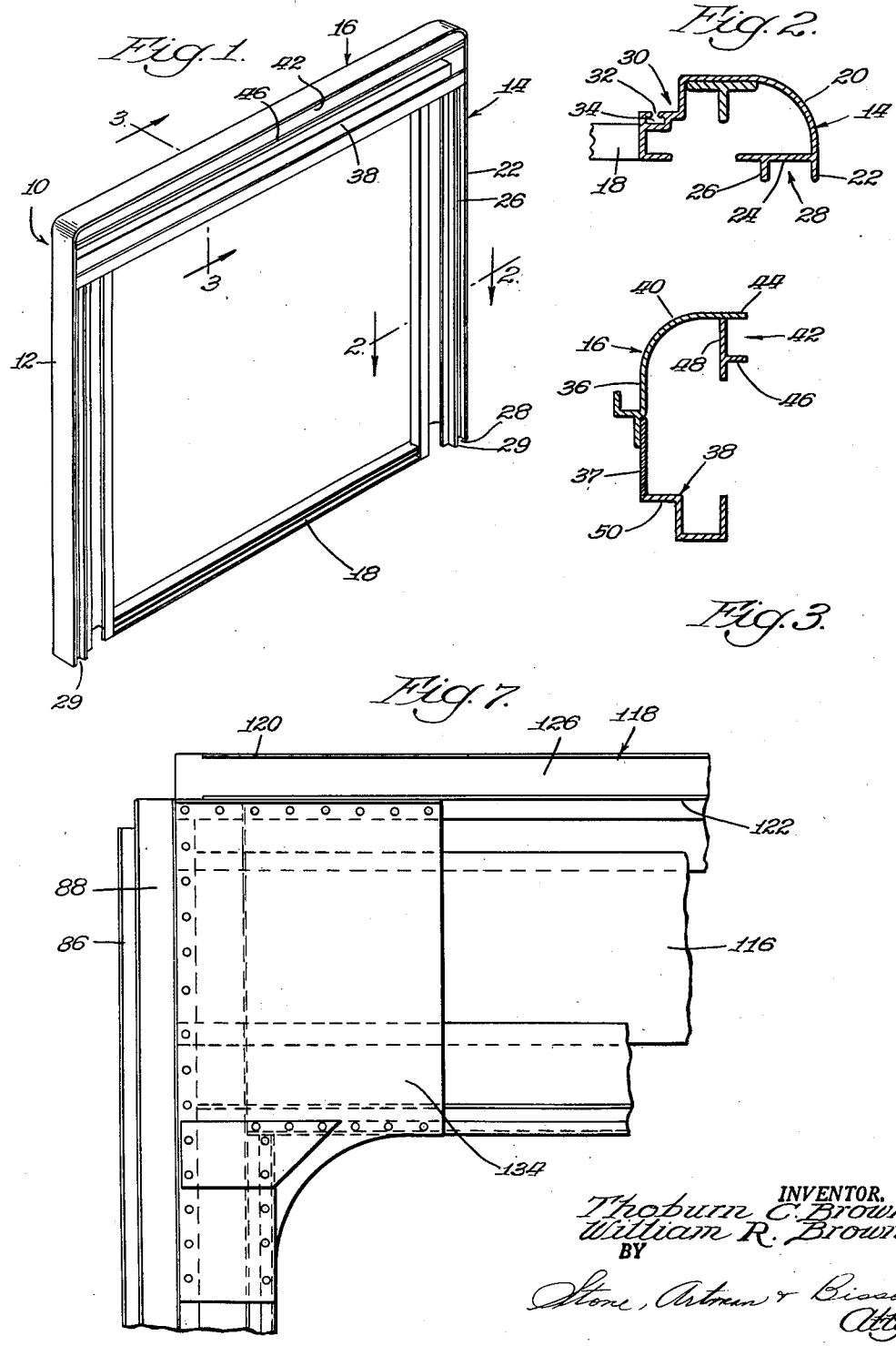
INVENTOR.
Thoburn C. Brown
William R. Brown
BY
Stone, Artman & Bisson
Attys.

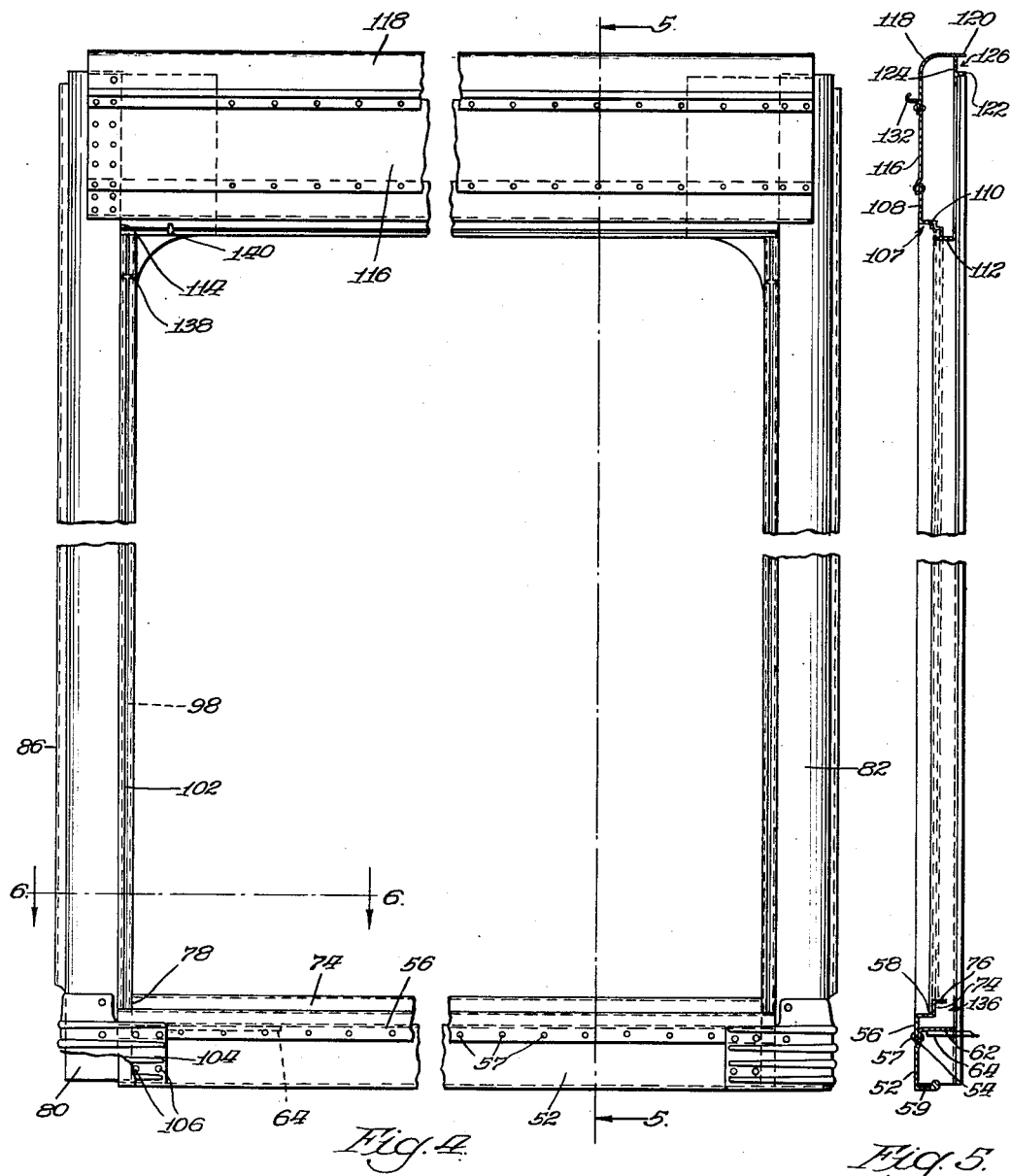

Patented Nov. 7, 1950

2,528,818

UNITED STATES PATENT OFFICE 2,528,818

REAR DOOR END ASSEMBLY

Thoburn C. Brown and William R. Brown,
Spokane, Wash.

Application March 11, 1947, Serial No. 733,870

7 Claims. (Cl. 296—28)

This invention relates to a rear door end assembly for an automotive truck or trailer and is a continuation in part of applicants' application, Serial No. 586,324, filed April 3, 1945, which application has been abandoned.

The principal object of this invention is to provide an end closure member carrying doors, called here a rear door assembly, for a truck or trailer body and which is a separate unit having cooperative members which make it possible to mount the rear door assembly as a unit on the open end of a truck or trailer body.

Another object of this invention is to provide corner pillars of a single piece of metal which carry a forwardly directed channel for receiving the ends of the body side walls and exactly relate them to the rear door assembly so as to eliminate jigs or templates or other measuring devices commonly used in getting the proper square relationship to the body. These same corner members are provided with vertical door jambs which contain integrally with themselves a seal-holding channel.

Another object of this invention is to provide a lintel and a header which may be variably related to each other so that the height of the door may be varied to suit the height of the opening desired. The header is equipped with a forwardly directed channel comparable to that on the corner pillars and adapted to receive the rear horizontal end of the trailer roof.

Another object of this invention is to provide a sill adapted to receive various types of thresholds, both of which may be quickly and strongly associated with the corner pillars.

Another object of this invention is to provide integrally with the corner pillars a flange to receive the corrugated sheathing of the side walls of the body.

These and such other objects as may hereinafter appear are attained in an embodiment of the invention disclosed in copending application, Serial No. 586,324, and in an improved embodiment, both shown in the accompanying drawings, comprising two sheets, wherein:

Fig. 1 is Fig. 2 in the drawings of application Serial No. 586,324, enlarged, and is a perspective view of the front face of applicants' rear door assembly;

Fig. 2 is identical with Fig. 7 in the drawings of Serial No. 586,324 with the side wall and wood frame omitted, and is a view taken on the line 2—2 of Fig. 1 of this application;

Fig. 3 is identical with Fig. 6 in the drawings of Serial No. 586,324 with the wood frame omitted and is a view taken on the line 3—3 of Fig. 1 of this application;

Fig. 4 is a rear face view of an improved rear door assembly;

Fig. 5 is a view taken on the line 5—5 of Fig. 4;

Fig. 6 is a view taken on the line 6—6 of Fig. 4; and,

Fig. 7 is an inside elevation of the upper corner of the assembly.

Continuing to refer to the drawings, and particularly to Figs. 1, 2, and 3, the rear door assembly generally identified by the numeral 10 comprises spaced corner pillars 12 and 14 joined by a header 16 and a sill 18. Referring to Fig. 2, a corner pillar comprises a curved central portion 20 having integral therewith a forwardly projecting wall 2, an inwardly projecting wall 24, and a forwardly projecting wall 26. Walls 22 and 26 form a channel constituting a side wall gripping channel 28 and wall 24 constitutes a stop. The other side of the curved central portion 20 extends inwardly of the back of the assembly and then forwardly to form a door jamb 30 having a vertical slot 32 opening into a vertical recess 34 in which may be positioned the base of a rubber door seal. The channel 28, being formed by an integral, molded metal shape, provides an accurate means for establishing a fixed parallel relationship between a side wall and the door jamb 30.

Referring now to Fig. 3, the header or lintel 16 comprises three members 36, 37, and 38. The member 36 has a curved central portion 40 and a forwardly directed channel 42 formed by two parallel walls 44 and 46 and a stop wall 48. The member 37 is a spacer plate which may be of various heights to accommodate different height doors, and it is assembled with the member 36 and the member 38 by welding or rivets. The member 38 carries a horizontal door jamb 50.

Referring to Figs. 1 and 2, the sill 18 joins the inside bottoms of the corner pillars.

The embodiment shown in Figs. 1, 2, and 3 is characterized by forwardly directed vertical and horizontal channels 28, 29, and 42. These channels being part of members which themselves carry portions of the door jamb, accurately relate the main body of the vehicle to the doors without assistance from jigs, etc.

Figs. 4, 5, 6, and 7 show an improved rear door assembly. Referring to Figs. 4 and 5, 52 is a U-beam still having a recess 54 in which seats the lower wall of a threshold 56 for a refrigerated trailer body. The two are held by rivets 57. Sill 52 carries a bottom flange 59. The threshold 56 has an angular recess 58.

Fastened beneath the horizontal wall 62 of the sill 52 at either end are gussets 64 and 66, which have the configuration indicated in Fig. 6 as defined by the lines 68, 70, and 72. The walls 74 and 76 of the threshold 56 are cut out at 78, and between this cut-out portion at 78 and the wall of the gusset 64 at 70 is inserted one side of a corner pillar 80. The corner pillar 80 is a beam and in cross section has a ninety-degree curved portion 84 which on its forward edge includes a siding cap 86 and a forwardly directed channel 88 formed by a stop wall 90 and two spaced parallel walls 92 and 94. On the inwardly directed edge of the curved portion 84 is a forwardly directed wall 96 constituting a door jamb, an inwardly directed wall 98 constituting a door stop, and a forwardly directed wall 100. A slot and recess 102 is incorporated in the corner pillar extrusion or casting to hold the base of a door seal. In this specification the words "door jamb" include not only what is properly the jamb, namely wall 96, but also the door stop 98, and the words "door jamb carrying a seal holder" mean a "door jamb and stop containing a seal holder."

The pillar 80, sill 52, threshold 56, and gusset 64 are held in assembled relationship by a corner casting 104 which has an inside surface that conforms to the outer contour of the corner pillar 80 and which is fastened to the side wall of the sill 52 and the side walls of the corner pillar 80 by suitable means such as bolts or rivets 106. Corner pillar 82 is similarly assembled to sill 52.

Referring to Figs. 4 and 5, the upper ends of the corner pillars 80 and 82 are held in assembled relationship by a lintel 107 comprising a facing 108, a horizontal door jamb 110 carrying a seal holder and a straight portion 112. The door jamb 110 and wall 112 are cut away at 114, see Fig. 4, so that the end of facing 108 may be riveted to the rear flat portion of the corner pillars 80 and 82. A header plate 116 is riveted to both the corner pillars 80 and 82 and to the lintel 107.

The top header, designated by the numeral 118, comprises a curved central portion having integral therewith forwardly directed walls 120 and 122 joined by a stop wall 124 and forming therebetween a gripping channel 126 for receiving the rear horizontal edge of a body roof. The header is riveted to both the header plate and to the tops of the two corner pillars 80 and 82. The header, referring to Fig. 5, carries a drip trough 132. The upper corners of the rear door assembly, and particularly the rigid alignment of the channels such as 88 in the corner pillar and 126 in the header, are established in rigid right-angular relationship both to each other and to the body of the vehicle by means of a gusset plate 134, see also Fig. 7.

It will be appreciated, therefore, that the forward face of the rear door assembly is bounded by four like-size channels 88, 89 (not shown), horizontal channel 136 in the sill, and horizontal channel 126 in the header. It is immaterial what the exact configuration of the rearwardly directed walls of the vehicle body may be so long as they fit snugly into the channels such as 126 in Fig. 5 so that they may be fastened to either or both the walls 120 and 122 by a series of rivets, or by a series of welds or a continuous weld. The advantage of the construction is that it establishes an accurate means of aligning the rear doors with the main body of the trailer.

The doors themselves are not shown because applicants use different types of doors.

It should also be noted that in the door jambs 98 and 110, the slot carries a transverse slot such as 138 or 140 into which the base of a rubber gasket may be fed and snapped into place.

Having thus described our invention, what we claim is:

1. As the vertical corner pillars for a rectangular frame for a rear end door assembly for a vehicle body to the walls of which the rear edges of the body of the vehicle may be fastened, an integral corner pillar of uniform cross section comprising a corner wall, a forwardly directed U-shaped channel in the forward edge of said corner wall, a door jamb extending forwardly from the inner edge of the corner wall parallel to the side walls of the U-shaped channel, a door stop extending from the inner edge of the door jamb inwardly of the assembly, a passageway in said doorstop extending the full length thereof, and a slot lengthwise of the doorstop and having a width less than the width of the passageway and connecting the passageway to the surface of the doorstop.

2. As the vertical corner pillars for a rectangular frame for a rear end door assembly for a vehicle body to the walls of which the rear edges of the body of the vehicle may be fastened, an integral corner pillar of uniform cross section comprising a corner wall, a forwardly directed U-shaped channel in the forward edge of said corner wall, a door jamb extending forwardly from the inner edge of the corner wall parallel to the side walls of the U-shaped channel, a door stop extending from their inner edge of the door jamb inwardly of the assembly, a passageway in said doorstop extending the full length thereof, a slot lengthwise of the doorstop and having a width less than the width of the passageway and connecting the passageway to the surface of the doorstop, and a transverse slot having a length approximately the width of the passageway and connecting the passageway to the surface of the doorstop so as to intersect the first slot at approximately right angles.

3. As the lintel for a rectangular frame for a rear end door assembly for a vehicle body having a forwardly directed channel on at least three sides thereof and to the walls of which the rear edges of the body of the vehicle may be fastened, an integral lintel of uniform cross section comprising a door jamb, a door stop, a passageway in said door stop extending substantially the full length thereof, and a slot lengthwise of the door stop and having a width less than the width of the passageway and connecting the passageway to the surface of the door stop.

4. As the header for a rectangular frame for a rear end door assembly for a vehicle body, a lintel having a door jamb carrying integrally therewith a seal holding channel, a cornice header spaced from and above the lintel having a forwardly directed channel lengthwise thereof and formed integrally therewith, and an upright plate fastened at its top edge to the header and along its bottom edge to the lintel.

5. A vehicle body rear end assembly for a door opening comprising a bottom sill, a top header, a pair of side pillars supporting said header upwardly and away from said sill, side wall mounting channels positioned about the perimeter of said pillars and header so as to receive and secure the walls and roof of a vehicle body, and a floor mounting channel fixed to said sill and so positioned as to receive the floor of a vehicle body, said channels being coextensive with the lengths of said header, pillars and sill.

6. As the corner of a rectangular frame for a rear end door assembly for a vehicle body a pillar comprising a rounded corner portion having a forwardly directed side wall receiving channel at its forward extremity, a door jamb and a door stop facing outwardly at its other extremity, the stop being at right angles to the forwardly directed extremity, and spaced inwardly from and substantially parallel to the base of the channel.

7. As the vertical corner pillars for a rectangular frame for a rear end door assembly for a vehicle body to the walls of which the rear edges of the body of the vehicle may be fastened, an integral corner pillar of uniform cross section comprising a corner wall, a forwardly directed U-shaped channel in the forward edge of said corner wall, a door jamb extending forwardly from the inner edge of said corner wall parallel to the side walls of the U-shaped channel, and a door stop extending from the inner edge of the door jamb inwardly of the assembly.

THOBURN C. BROWN.
WILLIAM R. BROWN.

REFERENCES CITED

The following references are of record in the file of this patent:

UNITED STATES PATENTS

| Number | Name | Date |
|---|---|---|
| 1,930,635 | Wessling | Oct. 17, 1933 |
| 2,069,219 | Conlon | Feb. 2, 1937 |
| 2,099,912 | Travis | Nov. 23, 1937 |
| 2,172,571 | Theriault | Sept. 12, 1939 |
| 2,363,170 | Fontaine | Nov. 21, 1944 |
| 2,471,917 | Wilson | May 31, 1949 |

FOREIGN PATENTS

| Number | Country | Date |
|---|---|---|
| 634,860 | Germany | Sept. 5, 1936 |